United States Patent
Beaurepaire et al.

(10) Patent No.: US 12,385,748 B2
(45) Date of Patent: Aug. 12, 2025

(54) SYSTEMS AND METHODS FOR DETECTING AND MAPPING LIDAR BLIND SPOTS IN PARKING GARAGES

(71) Applicant: HERE Global B.V., Eindhoven (NL)

(72) Inventors: Jerome Beaurepaire, Nantes (FR); Lauri Aarne Johannes Wirola, Tampere (FI); Eckhart Koppen, Tampere (FI); Tiitus Hiltunen, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 211 days.

(21) Appl. No.: 17/955,956

(22) Filed: Sep. 29, 2022

(65) Prior Publication Data

US 2024/0110799 A1   Apr. 4, 2024

(51) Int. Cl.
G01C 21/34    (2006.01)
G01S 17/89    (2020.01)
G06V 20/56    (2022.01)

(52) U.S. Cl.
CPC .......... *G01C 21/3461* (2013.01); *G01S 17/89* (2013.01); *G06V 20/56* (2022.01)

(58) Field of Classification Search
CPC ...... G01C 21/3461; G06V 20/56; G01S 17/89
See application file for complete search history.

(56) References Cited

U.S. PATENT DOCUMENTS

| | | | |
|---|---|---|---|
| 9,593,950 B2 | 3/2017 | Davidsson et al. | |
| 9,690,296 B1 | 6/2017 | Dolgov et al. | |
| 9,696,420 B2 | 7/2017 | Shaffer et al. | |
| 2018/0275277 A1* | 9/2018 | Li | G01S 17/89 |
| 2023/0228591 A1* | 7/2023 | Sundar | G01C 21/3885 701/400 |
| 2024/0035847 A1* | 2/2024 | Higuchi | G01C 21/3841 |

OTHER PUBLICATIONS

Im et al., "Parking line based slam approach using avm/lidar sensor fusion for rapid and accurate loop closing and parking space detection", Sensors • Nov. 2019, DOI: 10.3390/s19214811; Sensors • Nov. 2019 DOI: 10.3390/s19214811.
Jang et al., "Re-Plannable automated parking system with a stand-alone around view monitor for narrow parking lots," IEEE Transactions on Intelligent Transportation Systems (vol. 21, Issue: 2, Feb. 2020).
Li et al.,"Automated stereo-garage with multiple cache parking spaces—Structure, system and scheduling performance", Automation in Construction 119 (2020) 103377.

* cited by examiner

*Primary Examiner* — Aaron L Troost
(74) *Attorney, Agent, or Firm* — Jeffrey R Moisan; HERE GLOBAL B.V.

(57) ABSTRACT

An approach for detecting LIDAR blind spots in parking garages. This approach may comprise receiving floor layout data of a parking garage and, based on the received floor layout data, determining at least one additional floor layout data for a floor of a parking garage. The determined floor layout data may include LIDAR blind spot data based on clusters of similarly laid out floors.

11 Claims, 11 Drawing Sheets

SYSTEMS AND METHODS FOR DETECTING AND MAPPING LIDAR BLIND SPOTS IN PARKING GARAGES

BACKGROUND

In practice, positioning technologies could provide for numerous benefits, such as by enabling tracking of assets and/or navigation through indoor and outdoor environments, among other possibilities. Such benefits may be realized through the development of positioning system(s) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure deployed in buildings and/or outdoors (e.g., Wi-Fi, Bluetooth, Base Station(s) etc.) as well as on existing capabilities in consumer devices, such as on radio technologies that are already supported in numerous consumer devices on the market, among other options.

Modern vehicles include a plurality of different types of sensors for collecting a wide variety of information. These sensors include location sensors, such as global positioning system (GPS) sensors, LIDAR, etc. which may be configured to determine the location of the vehicle. Based upon the location of the vehicle, a variety of navigational, mapping and other services may be provided for manually driven vehicles as well as the provision of navigation and control of autonomous or semi-autonomous vehicles. Other examples of sensors include cameras or other imaging sensors that capture images of the environment including objects in the vicinity of the vehicle. The images that are captured may be utilized to determine the location of the vehicle with more precision. A more precise determination of the vehicle location may be useful in conjunction with the provision of navigational, mapping and other informational services for a manually driven vehicle. Additionally, the more precise determination of the vehicle location may provide for the improved navigation and control of an autonomous or semi-autonomous vehicle by considering the location of other objects, such as other vehicles, in proximity to the vehicle carrying the sensors. The sensors on board vehicles therefore collect a wide variety of data that may be utilized for various purposes. However, these sensors currently on-board vehicles do have limitations and do not provide all the different types of information that would be useful in various applications. One specific example of a current limitation is in the generation of alerts, route guidance, and automated vehicle controls in certain scenarios such as the presence of a LIDAR blind spot in a parking garage.

SUMMARY

Disclosed is an improved approach for detecting and mapping LIDAR blind spots in parking garages. One embodiment may be described as a method for mapping a parking garage, comprising: receiving, by one or more processors, floor layout data for at least a first floor of a parking garage; based on the received floor layout data for at least a first floor of a parking garage, detecting, by the one or more processors, at least one additional floor layout data for another floor of the parking garage, wherein the at least one additional floor has a substantially similar layout to the first floor of the parking garage; in response to detecting the at least one additional floor layout data for a floor of the parking garage, group by the one or more processors, the floors with substantially similar floor layout data into at least one cluster; making a determination, by the one or more processors, that at least one of the floor layout data in the cluster contains at least one LIDAR blind spot; and based at least on the determination, generating, by the one or more processors, LIDAR data for the at least one blind spot. The method above may also include LIDAR data for at least one blind spot in a floor layout data being generated from a corresponding area of floor layout data from another floor in a cluster. In some embodiments, the LIDAR data for at least one blind spot in a floor layout data may be inferred from image data captured of an area proximate to a blind spot. This image data may be captured from one or more cameras of a vehicle routed to an area proximate to a blind spot in some examples. In other embodiments, the LIDAR data for at least one blind spot may be generated from floor layout data of two or more floors with substantially similar layouts to the floor layout data containing the blind spot. In some embodiments, the at least one blind spot is determined based on the comparison of relative quality of LIDAR data from two or more substantially similar floor layout data. In other embodiments, at least one blind spot is determined based on end user driving behavior.

Another embodiment may be described as a user interface for providing a user a route, comprising the steps of receiving input upon a user device from the user that indicates a destination; accessing a geographic database to obtain data that represents drivable area in a region in which the user device is operating; determining a route to the destination by selecting segments of the drivable area to form a continuous path to the destination; and displaying the determined route or portion thereof to the user, wherein the determined route avoids at least one LIDAR blind spot in a parking garage. The route determined may avoid at least one LIDAR blind spot in real-time and the user interface may be displayed on an end user device. The user interface may be displayed in a motor vehicle and the user interface may route an end user proximate to the blind spot. The user interface may also prompt an end user to capture image data of the LIDAR blind spot when the end user is proximate to the blind spot and the user interface may be updated in real-time via data captured by an end user.

In yet another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed method(s), among others.

In yet another aspect, disclosed is a non-transitory computer readable medium having stored thereon instructions executable by processor(s) to cause an apparatus to perform operations described herein, such as any of those set forth in the disclosed method(s), among others.

In yet another aspect, disclosed is a computer program product including instructions which, when the program is executed by a computer, cause the computer to carry out the steps described herein, such as any of those set forth in the disclosed method(s). In other words, the computer program product may have computer-executable program code portions stored therein, the computer-executable program code portions including program code instructions configured to perform any operations set forth in any of the method(s) disclosed herein, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
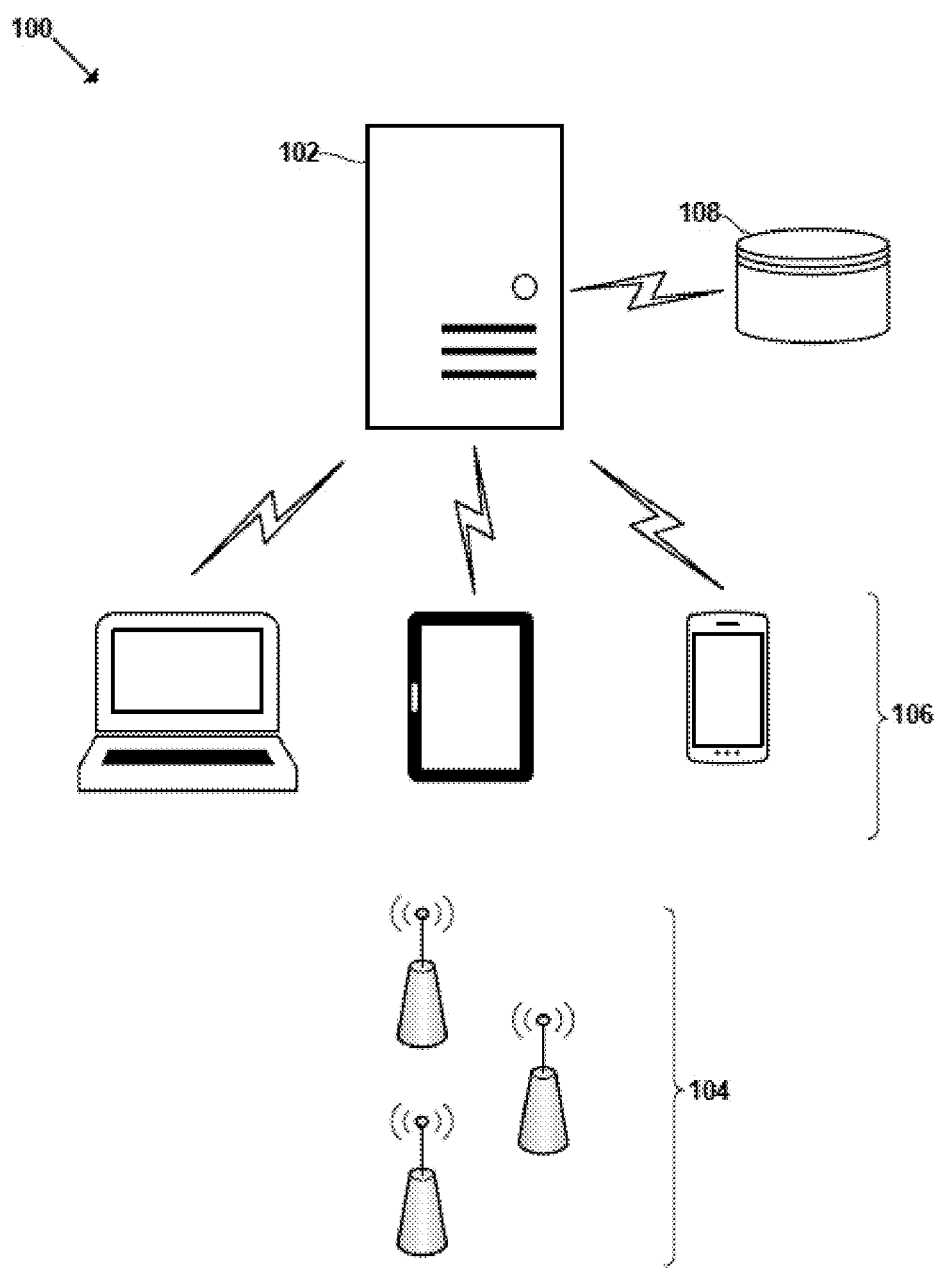
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. EXAMPLE SYSTEM(S) FOR INDOOR AND/OR OUTDOOR POSITIONING

Positioning methods that are seamless and available at all times might rely upon novel systems and solutions that are specifically developed and, if necessary, deployed for this purpose. Traditional positioning technologies, which are mainly used outdoors (e.g., satellite positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g., satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) and/or other network fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure and on existing capabilities in the consumer devices. For example, the positioning solution could be based on e.g., Cellular network infrastructure, Wi-Fi and/or Bluetooth, which are technologies already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations (e.g., systems, apparatuses, methods, user interfaces, etc.). Arrangement 100 could include a server system 102 (could also be referred to as server(s) or the like), radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options. In some cases, a mobile device could also be referred to as a handheld device or a user device, among other possibilities.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in particular area(s), which may be indoors and/or outdoors.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent measurement(s) by the mobile device and a position estimate (for geo-referencing e.g., radio data collected by the mobile device). The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may define the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s)

included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g., barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
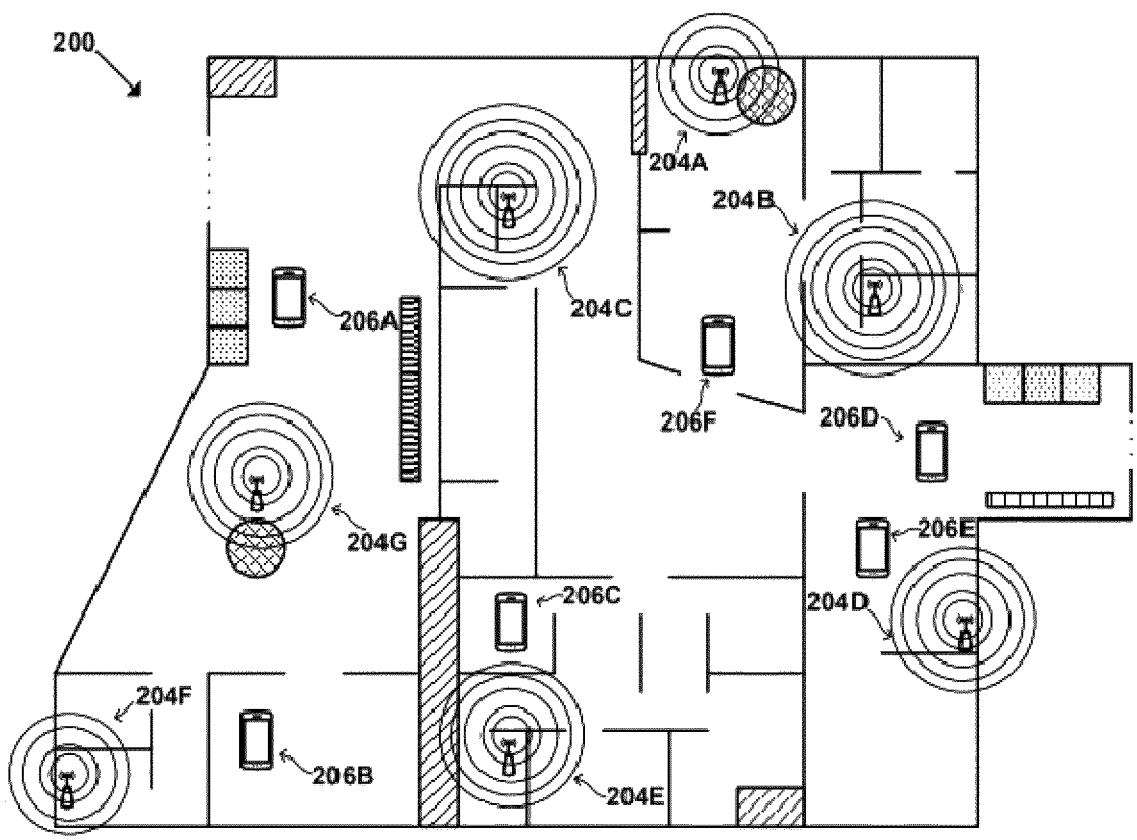
FIGS. 2A and 2B illustrate an indoor area at which radio device(s) and mobile device(s) can be located, in accordance with an example implementation.
Figure 2B:
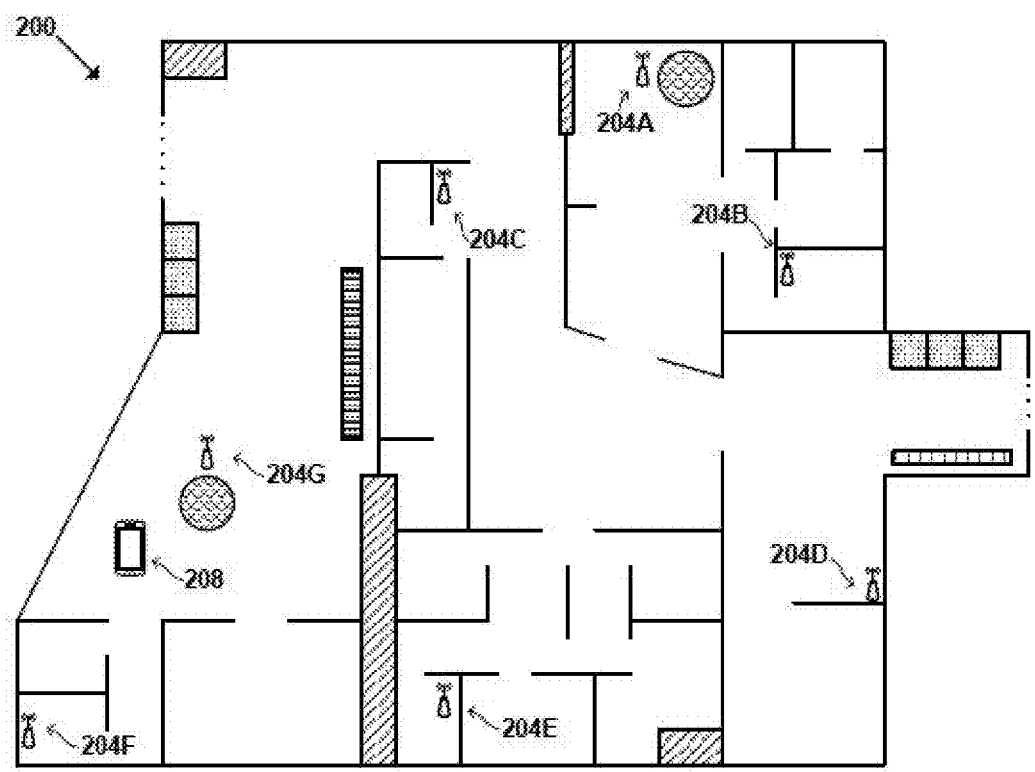
Figure 2C:
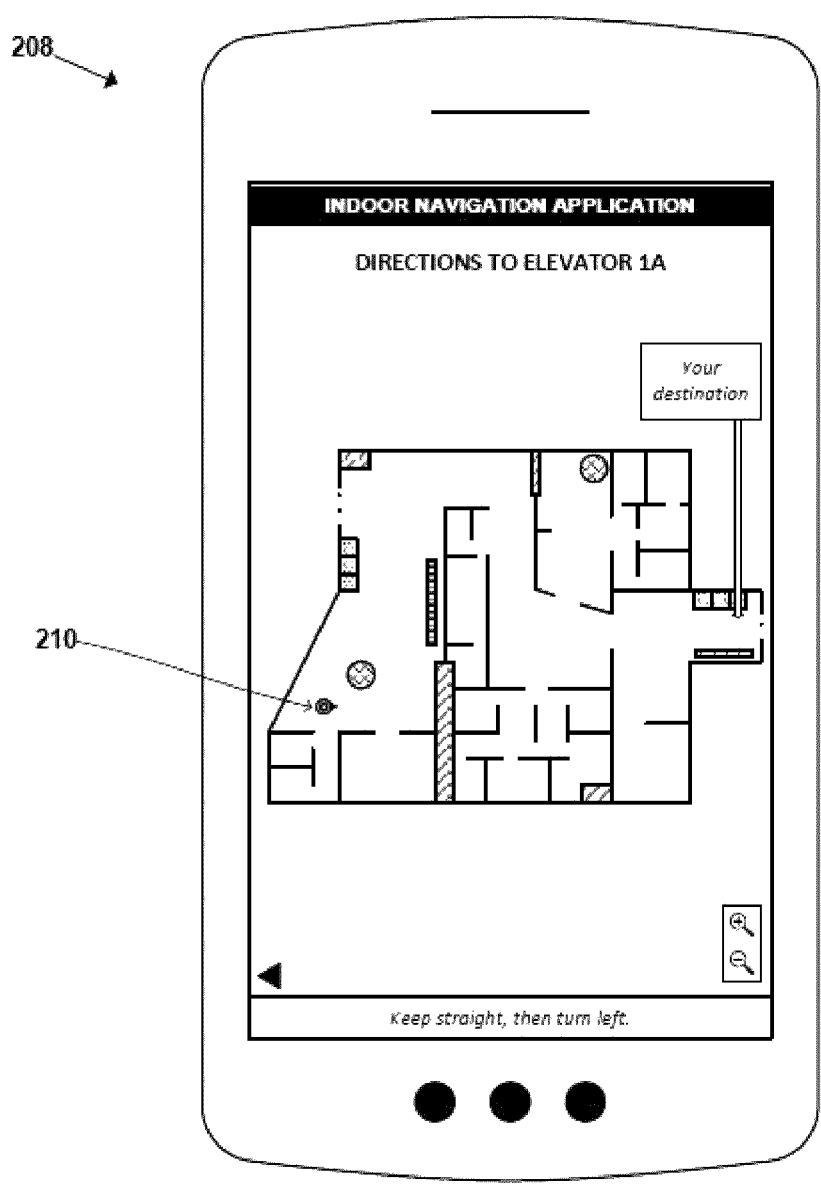
FIG. 2C illustrates an example indoor navigation application, in accordance with an example implementation.

FIGS. 2A to 2C next illustrate an example implementation and use of the above-described positioning solution. Although FIG. 2A to 2C illustrate an implementation in the context of an indoor scenario, it should be understood that the same or similar positioning solution could extend to apply in the context of various outdoor scenarios and implementations.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible. FIG. 2C also demonstrates how a graphical user interface may be used to control and interact with the apparatus in some embodiments.

The examples above are one manner by which indoor positioning might occur and are in no way limiting. Various other systems and methods for indoor, semi-indoor, and outdoor positioning might also be utilized by various embodiments of the presently disclosed apparatus, methods, etc.

For example, LIDAR mapping may be used in combination with the above to map an area or refine the map data for that area. Examples of LIDAR being utilized to map an area and generate navigation data may be found in U.S. Pat. No. 8,751,156, incorporated herein by reference.

Image data may also be used to capture, map, and generate navigation data in various embodiments of the presently disclosed apparatus, system, process, method, etc. Examples of mapping utilizing image data may be found in U.S. Pat. No. 11,232,582, incorporated herein by reference.

End user driving behavior data, satellite data, and other types of data may also be utilized by the presently disclosed system. Examples of such data being utilized may be found in U.S. Pat. No. 9,347,779, incorporated herein by reference.

II. EXAMPLE HARDWARE AND SOFTWARE

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 3:
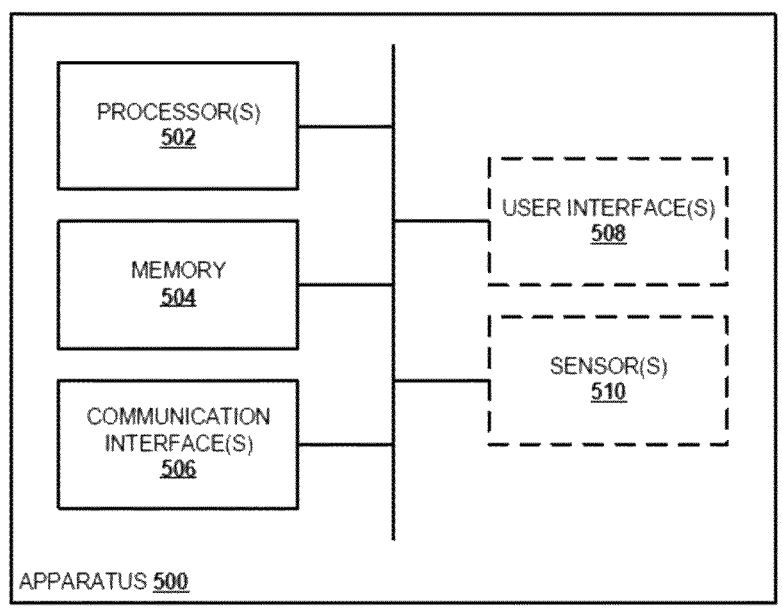
FIG. 3 is a schematic block diagram of an apparatus that may be involved in a feedback loop for improving a positioning system.

FIG. 3 is a schematic block diagram of an apparatus 500 that may be involved in a feedback loop for improving performance of a radio-based positioning system, according to an example embodiment. The apparatus 500 could, for instance, represent a server (e.g., server system 102) or a mobile device (e.g., one of the mobile devices 106), among other options. Moreover, the apparatus 500 could take the form of or otherwise be part of a system, such as any of those described herein.

As shown, apparatus 500 could include processor(s) 502, a memory 504 (e.g., database 108), communication interface(s) 506, an (optional) user interface(s) 508, and (optional) sensor(s) 510. Some or all of the components of the apparatus 500 may be connected via a bus (or other mechanism) and/or be combined into one or more modules.

Processor(s) 502 could have numerous functions, such as controlling the memory 504, communication interface(s) 506, the user interface(s) 508, and/or the sensor(s) 510 in any feasible manner currently known or developed in the future. For example, the memory 504 could include or otherwise contain computer program code (program instructions), and the processor(s) 502 may be configured to execute the program code to cause the apparatus 500 to perform and/or control operations, such as any of those described herein and/or other operations. Thus, apparatus 500 and/or processor(s) 502 could be referred to as carrying out such operations.

Moreover, processor(s) 502 (and also any other processor(s) mentioned herein) may be processor(s) of any suitable type. For example (and without limitation), processor(s) 502 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 504 could also take various form without departing from the scope of the present disclosure. In particular, memory 504 could be separate from processor(s) 502. Additionally or alternatively, memory 504 may be part of or otherwise integrated with one or more of the processor(s) 502. In this case, memory 504 may be fixed to the from processor(s) 502 or may be at least partially removable from the processor(s) 502. In any case, the memory 504 be or take the form of volatile and/or non-volatile memory, and could include program memory, working memory, and/or data memory, among others.

By way of example (and without limitation), memory 504 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 504 may additionally or alternatively include an operating system for processor(s) 502 and/or firmware for apparatus 500. Further, memory 504 could additionally or alternatively be used by processor(s) 502 when executing an operating system and/or computer program. Moreover, memory 504 could additionally or alternatively store data, such as any types, sets, instances, and/or samples of data described herein. Other examples are also possible.

Further, communication interface(s) 506 could enable the apparatus 500 to communicate with other entities. The communication interface(s) 506 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 506 may take the form of or provide for wireless and/or wired communication with transmitting and/or receiving device(s), such as one or more antenna(s) and/or radio receiver(s) of the apparatus 500.

Yet further, user interface(s) 508 could be any device(s) for presenting and/or receiving information. For instance, user interface(s) 508 include display device(s), audio device(s) or the like for visually and/or audibly providing information (e.g., to a user). Additionally or alternatively, user interface(s) 508 could include input device(s) (e.g. a keyboard, keypad, touchpad, mouse, etc.) for receiving information (e.g., based on input provided by a user).

Finally, sensor(s) 510 could include any type(s) of sensor(s) currently known and/or developed in the future. For example, sensor(s) 510 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 500 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory.

Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

The device, system, apparatus, methods, etc. may also include one or more light sources and one or more light receivers. In one embodiment, a Light Detection and Ranging ("LIDAR") device or sensor, a laser device, and/or other device that collects data points, such as three-dimensional data, by transmitting and receiving light may be utilized. For example, a LIDAR device that uses one or more lasers to collect data points representing a surrounding area, such as an area about a road or path or other area. The LIDAR device collects and gathers data points in a point cloud, such as a three dimensional ("3D") point cloud, in which each data point corresponds to a local coordinate, such as (x, y, z). The one or more lasers may be in a near infrared spectrum (such as about 700 nm to about 5000 nm or about 800 nm to about 2500 nm) or another light spectrum.

The LIDAR devices/sensors may feature one or more buttons, keypad, keyboard, mouse, stylist pen, trackball, rocker switch, touch pad, voice recognition circuit, or other device or component for controlling or inputting data in one or more of the components of the device.

The data collected by the LIDAR device(s) may be stored on one or more computer-readable media, such as a CD-ROM, DVD, flash drive, hard drive, or other non-transitory tangible media suitable to store data. Alternatively, the media may be signals carrying or having data. Separate media may be used to store separate or different types of data. In one embodiment, photographic images (such as digital or electronic photographs), video images, LIDAR data or laser data, location data, and/or other geographic data collected by the LIDAR device is stored in one or more media. The collected image/video data may represent areas or regions about or around a path, road, or other area. For example, the collected image or video data may include geographic features, such as sky features, terrain or surrounding features, roads or paths (such as sidewalks), road or path markings (such as cross-walks or lane markings), road or path signs, points-of-interest ("POIs") such as buildings, parks, museums, indoor mapping data, etc., and/or other man-made and/or natural features or objects.

The collected image or video data and/or other collected data are sent, such as via one or more media, to the geographic database (see below). Some or all of the collected data may be transmitted to the geographic database developer via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection.

III. EXAMPLE GEOGRAPHIC DATABASE

Figure 4:
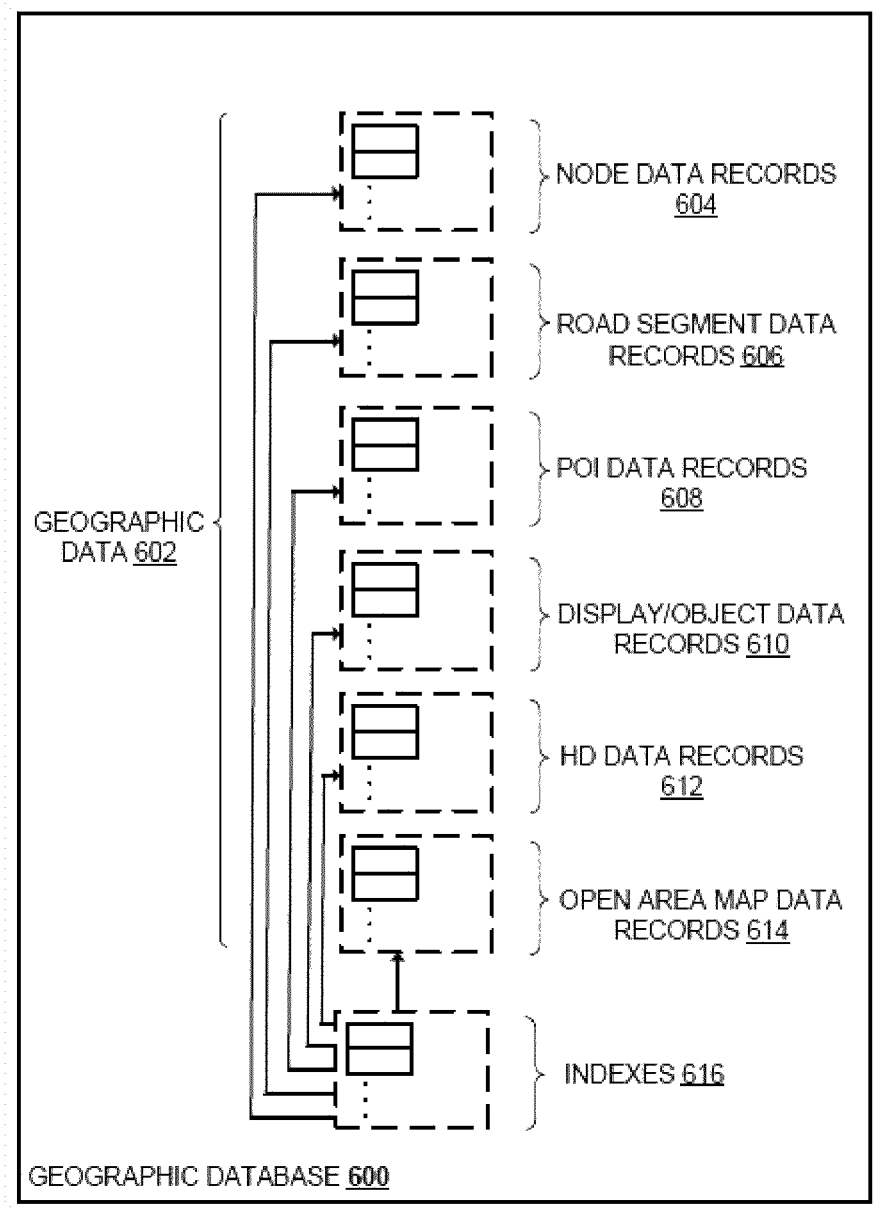
FIG. 4 illustrates a diagram of a geographic database, according to an example implementation.

FIG. 4 illustrates a diagram of a geographic database 600, according to an example implementation. Geographic database 600 could be included within, integrated with, or be separate from another database, data storage device, memory, or the like described herein (e.g., memory 504). Additionally, or alternatively, geographic database 600 could be stored on or otherwise made accessible to any entity described herein without departing from the scope of the present disclosure. Moreover, although certain aspects of the geographic database are described in the context of outdoor mapping and/or outdoor navigation-related services, it should be understood that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 600 may include geographic data 602 used for (or configured to be compiled to be used for) mapping and/or navigation-related services. For instance, the geographic database 600 may include high resolution or high definition (HD) mapping data that provide centimeter-level or better accuracy of map features. By way of example, the geographic database 600 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 612) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 600, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 600.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 600 may follow certain conventions. For example, links might not cross themselves and might not cross each other except at a node. Also, there may be no duplicated shape points, nodes, or links. Two links that connect each other may have a common node. In the geographic database 600, overlapping geographic features may be represented by overlapping polygons. When polygons overlap, the boundary of one polygon may cross the boundary of the other polygon. In the geographic database 600, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 600 may be stored as a hierarchical or multi-level tile-based projection or structure. More specifically, in one embodiment, the geographic database 600 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 600 may include node data records 604, road segment, drivable area, or link data records 606, Points of Interest (POI) data records 608, display/object data records 610, HD mapping data records 612, open area map data records 614, and indexes 616, for example. More, fewer or different data records can be provided. For example, other data records can include cartographic data records, routing data, and/or maneuver data. Further, the indexes 616 may improve the speed of data retrieval operations in the geographic database 600. For instance, the indexes 616 may be used to quickly locate data without having to search every row in the geographic database 600 every time it is accessed. For example, in one embodiment, the indexes 616 can be a spatial index of the polygon points associated with stored feature polygons.

In exemplary embodiments, the road segment data records 606 may be links or segments representing roads, streets, paths, or another drivable area (e.g., parking lots and structures) as can be used in a calculated or recorded route information for determination of one or more personalized routes. The node data records 604 may be end points corresponding to the respective links or segments of the road segment data records 606. The road segment data records 606 and the node data records 604 may represent a road network, such as used by vehicles, cars, and/or other entities. Alternatively, the geographic database 600 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related road attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 600 can include data about the POIs and their respective locations in the POI data records 608. The geographic database 600 can also include data about places, such as cities, towns, or other communities, and other geographic features, such as bodies of water, mountain ranges, etc. Such place or feature data can be part of the POI data records 608 or can be associated with POIs or POI data records 608 (such as a data point used for displaying or representing a position of a city). Other examples are also possible.

In some implementations, the geographic database 600 can include display/object data records 610 for storing machine-readable visual representations and map data decoded from the visual representations and their respective properties. In addition, the display/object data records 610 can store post-processing rule sets for correcting and/or reducing the uncertainties in the display/object data decoded from clustered machine-readable visual representations. The display/object data records 600 can also store data selection rules (e.g., in a map data extension layer) for selecting from among multiple sets of readings of a machine-readable visual representation. The display/object data records 600 can also store confidence or accuracy determinations for the decoded map data. By way of example, the display/object data records 600 can be associated with one or more of the node records 604, road segment records 606, and/or POI data records 608 to support uses cases such as enhanced mapping user interfaces (UIs), autonomous driving, dynamic map updates, etc. In some cases, the display/object data records 610 may be stored as a data layer of the hierarchical tile-based structure of the geographic database 600 according to the various embodiments described herein.

In some implementations, as discussed above, the HD mapping data records 612 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 600 can be maintained by a content provider in association with a services platform (e.g., a map developer). The map developer can collect geographic data to generate and/or enhance the geographic database 600. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 600 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 600 could additionally or alternatively include open area map data record(s) 614 for open area map(s). Generally speaking, open area map(s) may include image(s) or the like of respective layout(s) representing pedestrian walkable area(s) (e.g., indoor area(s), such as one or more floors of a building and/or garage), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 600). The geographic map may be or include geographic data (e.g., any feasible data from records 604-612) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 600 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways/drivable areas, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

IV. EXAMPLE METHOD(S) FOR BLIND SPOT DETECTION AND REMEDIATION

As noted above, the present disclosure is directed to an improved approach for detecting blind sports in LIDAR data and remedying them.

Figure 5:
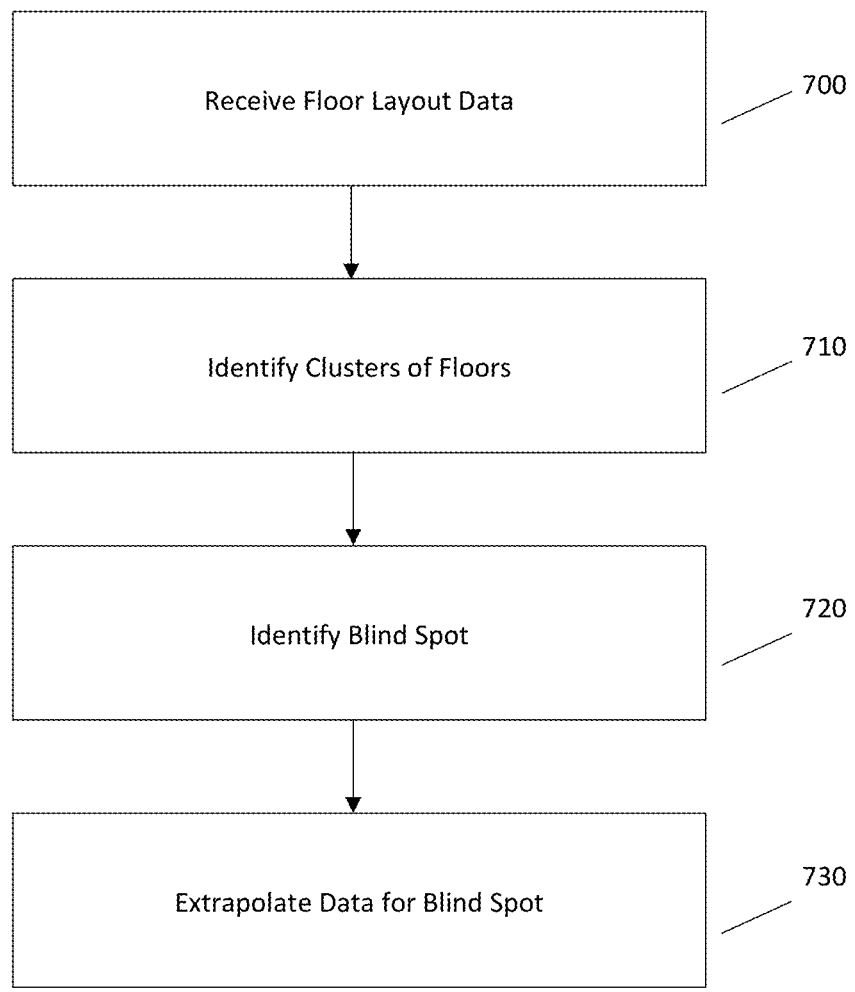
FIG. 5 is a flowchart illustrating one embodiment of how the presently disclosed system, apparatus, methods, etc. may detect and remedy LIDAR blind spots.

FIG. 5 is a flowchart illustrating one embodiment of how the presently disclosed system, apparatus, methods, etc. may detect and remedy LIDAR blind spots. At a first step, the apparatus may receive floor layout data for one or more floors of a parking garage (block 700). As mentioned above, the floor layout data may be in the form of radio data, LIDAR data, image data, satellite data, end user driving records, etc. All of this data may be stored and accessed via one or more geographic data bases. The geographic databases may include both data captured for a given floor and data extrapolated or inferred about floor(s) by the apparatus.

At a second step, when the apparatus has obtained floor layout data, it may then identify two or more floors of a parking garage that have the same or substantially similar layout and group these floors into a cluster (block 710). The identified floors may be deemed to be part of the same cluster of floors and floors may be part of more than one cluster. The identification of floors in a cluster may be based on vehicle routes/paths typically traveled on the different floors. Through machine learning, pattern matching, etc. the apparatus may deduce which floors are substantially similarly to one another. In one embodiment, the level of similarity may be recorded in a geographic database and a certain threshold value must be reached for the apparatus to cluster floors together. For example, if the floors have similar dimensions (e.g., 50 m×50 m) and parking spots located in similar areas (as confirmed by image data, driving records, radio data, etc.) then the system may award a similarity score of 0.75 between the two floors in this example. Over time this score might be updated higher or lower based on additional data. In this example, the apparatus may be set to flag anything with a similarity score of over 0.6 as in the same cluster, thus these two floors would be clustered.

Additionally, or alternatively, the identification of floors in a cluster may be based on historic data and/or real time data such as floor plan information, existing map data, other sensor data, and/or manual user indication. Optionally, the apparatus may make general assumptions that at least some floors (e.g., floors other than the entrance floor) of the same parking garage have the same or similar layout based on common construction techniques. In some cases, a given floor can be a subset of another floor meaning one floor may match the layout of another floor for the most part but include additional areas like a delivery dock, emergency exit, etc.

At a next step, the apparatus may then identify at least one blind spot on a given floor (block 720) where the blind spot indicates a location/area where LIDAR data is missing or otherwise deemed insufficient or inaccurate. In one embodiment, identification/detection of a blind spot in LIDAR data may be done by comparing areas on a floor first examined by the apparatus to the corresponding areas on other floors in a floor cluster. If LIDAR data exists for the corresponding area on the other floor(s) (but does not exist for the same area on the first floor examined), that area on the first floor may be deemed as a blind spot. In some embodiments, if the LIDAR data for the corresponding area in the other floor(s) is better quality as compared to LIDAR data for the same area on the first floor, that area on the first floor can also be deemed as a blind spot.

The assessment of the quality of the data may be based on density, freshness, etc. of the LIDAR data points. If the LIDAR data for the area on the first floor is sustainability different from LIDAR data for the same area on one or more other floors of a cluster, that area on the first floor can also be deemed as a blind spot for being unusual/an outlier. The assessment of a blind spot may indicate that the area covered by the blind spot includes inaccurate LIDAR data or that there has potentially been a change to feature(s) in that area of the first floor (e.g., change in traffic rule marking, parking spot marking location, additional infrastructure, etc.). Additionally, or alternatively in some embodiments, manual indication, image data, radio data, etc. may be utilized for detecting a blind spot. For example, the presence of a vehicle in a parking spot in an existing blind spot may indicate the area is now safe for parking. The opposite may also be true (e.g., cars no longer park in an area previously mapped) among other options.

Once a blind spot/LIDAR data discrepancy has been identified, the apparatus may then extrapolate data (in whole or in part) which can cure the discrepancy (block 730). In one embodiment, the apparatus may trigger generation/collection of LIDAR data for the blind spot on the impacted floors. This triggering may be done based on a threshold score tied to the quality of the LIDAR data. For example, if there is no LIDAR data for an area of a floor as compared to other floors, the apparatus may award such a blind spot a 1.0 since there is no data and an affirmative blind spot. Alternatively, if there is LIDAR data for a floor which is several years old while other floors in the same cluster have LIDAR from last week, the apparatus may score this years old floor data as 0.6. In this case, the threshold for flagging a blind spot in the LIDAR data may be set at 0.75 thus triggering in response to the no data scenario (1.0 score) and only flagging the 0.6 scored data as requiring an alert to end users to use caution due to the older (potentially unreliable) data. Such levels of severity for blind spots can be used for routing, alerts, etc. alone and in combination with automated vehicles, high assisted driving solutions, etc.

For clarification, throughout this disclosure there are many references to a "first floor" of a parking garage. This "first floor" may mean any floor of the parking garage (e.g., first, second, top floor, bottom floor, etc.) and is not meant to limit the examples to use on the actual first (e.g., ground floor) of a given parking garage.

In some embodiments, the LIDAR data for a blind spot in the layout data of a floor may be generated based on LIDAR data for the corresponding area in other floor(s) that are in the same cluster as the given floor. The data for related floors in a cluster may be combined, averaged, and/or duplicated to generate the LIDAR data for the blind spot. This generated LIDAR data may be referred to as "inferred" LIDAR data. The system can classify the generated LIDAR data as 'inferred' and collected/detected LIDAR data as "collected" or the like, so that the two sets of LIDAR data can be distinguished from one another and their potential differing levels of quality/exactness.

In some embodiments, the blind spot data may be obtained from vehicle-based collection of additional LIDAR data for the blind spot. In one example, this may include routing vehicles (automatically or manually) towards the area(s) proximate to a blind spot for further LIDAR data collection and/or changing vehicle driving parameters (e.g., slower speed) around the blind spot area so as to enhance LIDAR data collection. The blind spot data may also be obtained via manual collection (e.g., by a parking garage operator or other end user) by using a LIDAR device on a phone, tablet, or other end user device. The request for collection of data may indicate the blind spot area via a graphical user interface, alert(s), etc.

It should be noted that any feasible combination of the options above may be used in whole or in part and the divisions above are non-limiting. For example, when a blind spot is found in a parking garage's LIDAR data, the apparatus may at first generally extrapolate the data for the blind spot from other floors in a cluster, then route an automated vehicle to collect image data of the area proximate to the blind spot, and then finally prompt an end user in the area (as determined by GPS data, etc.) to collect up-close ground truth data for highly accurate LIDAR data.

In the example above, the inferred LIDAR data from the other floors in a cluster may or may not be sufficient. Assessment of the inferred data may be done in any functional manner include end user feedback. The apparatus may, in some examples, progress from the cluster floor comparison to collection of ground level image data, LIDAR data, radio data, etc. only when needed or automatically request further collection in response to any LIDAR data inferred/extrapolated by the apparatus. This approach may be utilized to create a feedback loop/machine learning to help guide future LIDAR data generation and inferences. In other embodiments the inferred LIDAR data can be duplicated or otherwise used to enhance LIDAR data for additional floors in a cluster that also have one or more blind spots in the same corresponding area simultaneously or sequentially.

In some embodiments, the apparatus may rank the severity of blind spots based on size, location, and other data such as car damage or accidents report, parking tickets, etc. For example, higher priority blind spots may be in an area that includes key features to be identified/detected such as: parking spot lane markings, traffic rule markings, traffic signs, drivable areas, walkable areas, pedestrian crossings etc. Lower areas might include something inaccessible and generally irrelevant to mapping for navigation such as behind a dumpster or on parking garage levels which are not in use. The higher (and lower) blind spot priorities may be determined based on LIDAR data from other floor(s) in the cluster. For example, if a first floor has a blind spot for a particular area and the LIDAR data indicates a traffic sign in a corresponding area of another floor in a cluster, then that blind spot may be deemed to be a high priority blind spot on that first floor.

In some embodiments, the apparatus may use non-LIDAR sensor data to analyze the different collection outcomes for the same area in different floors of a cluster (e.g., one floor of the cluster has a blind spot in the area and the other has high-quality LIDAR data in the area). For example, if only image data is available of a given area, LIDAR data may be extrapolated from the image to help address a given blind spot. The apparatus may also compare meta data about the LIDAR data collected to identify characteristics in one floor as compared to another. This may be useful to determine how collection techniques may have impacted the resulting LIDAR data. For example, the meta data may include driving patterns of the collection vehicle(s), speed, frequency of passing the area, distance from area at which collection was happening etc.

In yet other embodiments, every floor of a floor cluster may have a blind spot in the same area. In such situations the apparatus may still use LIDAR data from a similar area in those floors and extrapolate an estimate for what is within the blind spot. In some cases, two clusters of floors may be sufficiently similar to allow for extrapolation from one cluster to another. In other examples, the apparatus might request or deduce additional information about the area at issue in attempt to determine what is causing the repeated blind spot. For example, the apparatus may refer to other sensor data, LIDAR data, floor maps, existing map data, or the like to determine object(s) that may be causing the repeated blind spot. The objects may be long-term parked vehicles (e.g., in an airport), presence of a column or other building support structure blocking LIDAR data collection for the area, piping or other infrastructure, and/or a reflective object (e.g., mirrors, glass, etc.) that is presenting issues, among other options. Machine learning may be used to predict blind spot locations and causes. As mentioned above, there are some common sources of LIDAR blind spots like mirrors or physical infrastructure blocking successful mapping of an area. In these cases, one or more machine learning models may be trained to examine trends in the LIDAR data to determine where blind spots might occur and what could be causing them.

The apparatus, such as the processing circuitry, may train any of a variety of machine learning models to identify LIDAR blind spots and/or their sources based upon a single or plurality of data points, images, audio, etc. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts LIDAR blind spots and/or sources with the greatest accuracy. The machine learning model that has been identified as most accurate may then be thereafter utilized.

Figure 6:
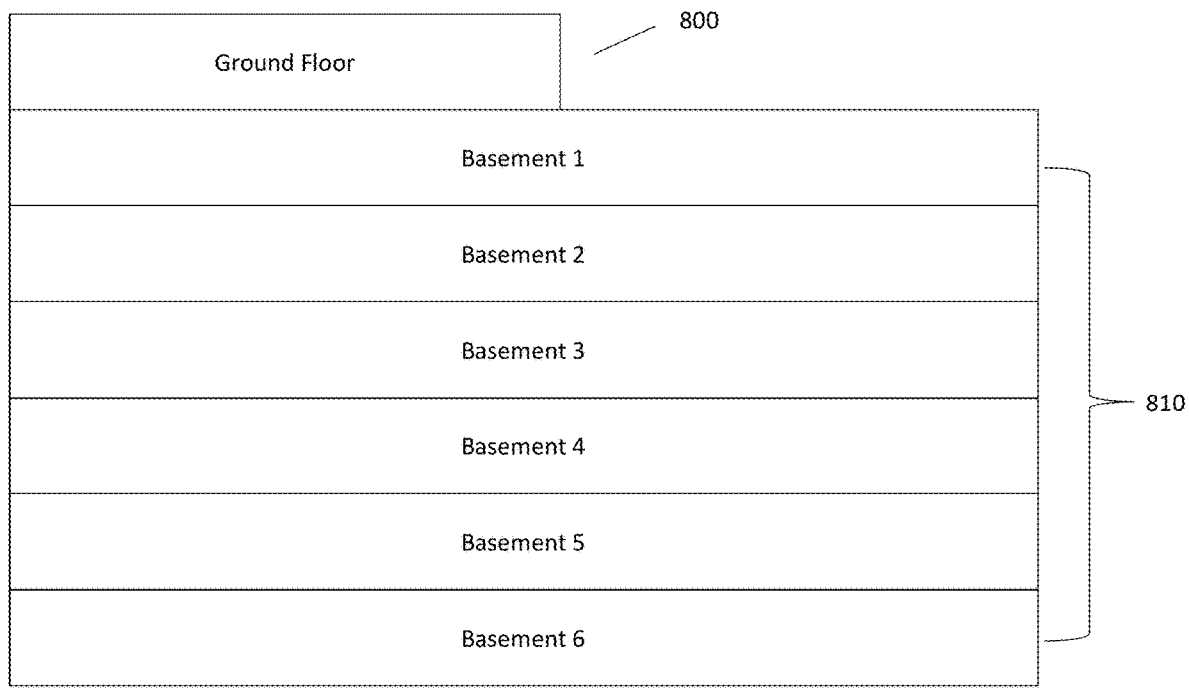
FIG. 6 is a side-view diagram of a parking structure.

FIG. 6 is a side-view diagram of a parking structure. As shown in FIG. 6, the apparatus may analyze the individual floors 800 of a parking structure to identify those floors which have similar dimensions, driving patterns, etc. In this example, the ground floor of the parking structure has a smaller and different floor plan than the other floors (Basements 1-6). Thus, in this embodiment the apparatus may group floors Basement 1-6 together in a cluster 810 as they have similar dimensions, etc.

Figure 7A:
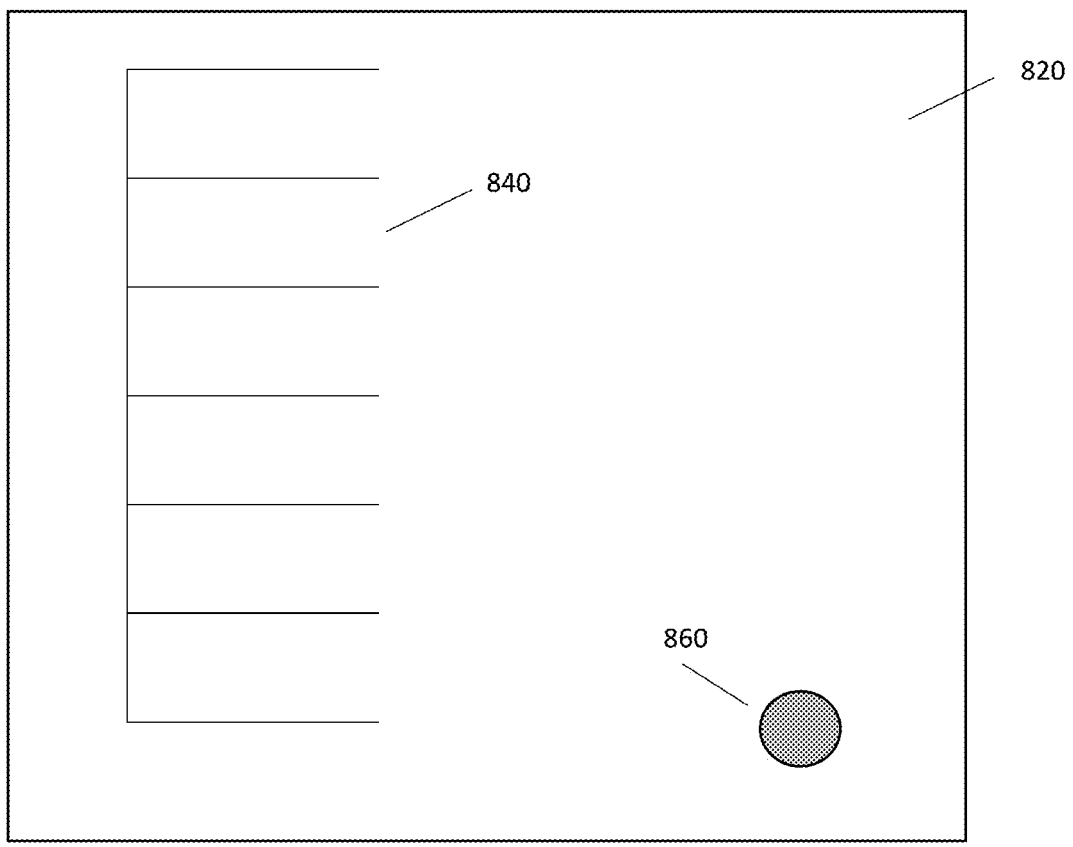
FIG. 7A-7B are top-down diagrams of floors of a parking garage.

FIG. 7A is a top-down diagram of a floor of a parking garage. As shown in FIG. 7A, the floor 820 contains various map objects, roadway attributes, POIs, etc. including the parking spaces 840. Additionally, on the floor 820 shown, there is a blind spot 860 in the LIDAR data map for the floor layout of floor 820. The LIDAR blind spot 860 may be determined by any functional means including comparison to another floor within a cluster (e.g., a floor with the same or similar layout). In this case the LIDAR blind spot 860 is shown as a grey circle but the size and shape of the LIDAR blind spot may cover any size or shape and be non-contiguous. For example, if mirrors are hung up on the wall at certain intervals, the blind spot may cover an area which is intermingled with some LIDAR data (unusual LIDAR data may be a blind spot). It should be noted that in this example, floors 820 and 880 (seen below in FIG. 7B) are part of the same cluster 810.

Figure 7B:
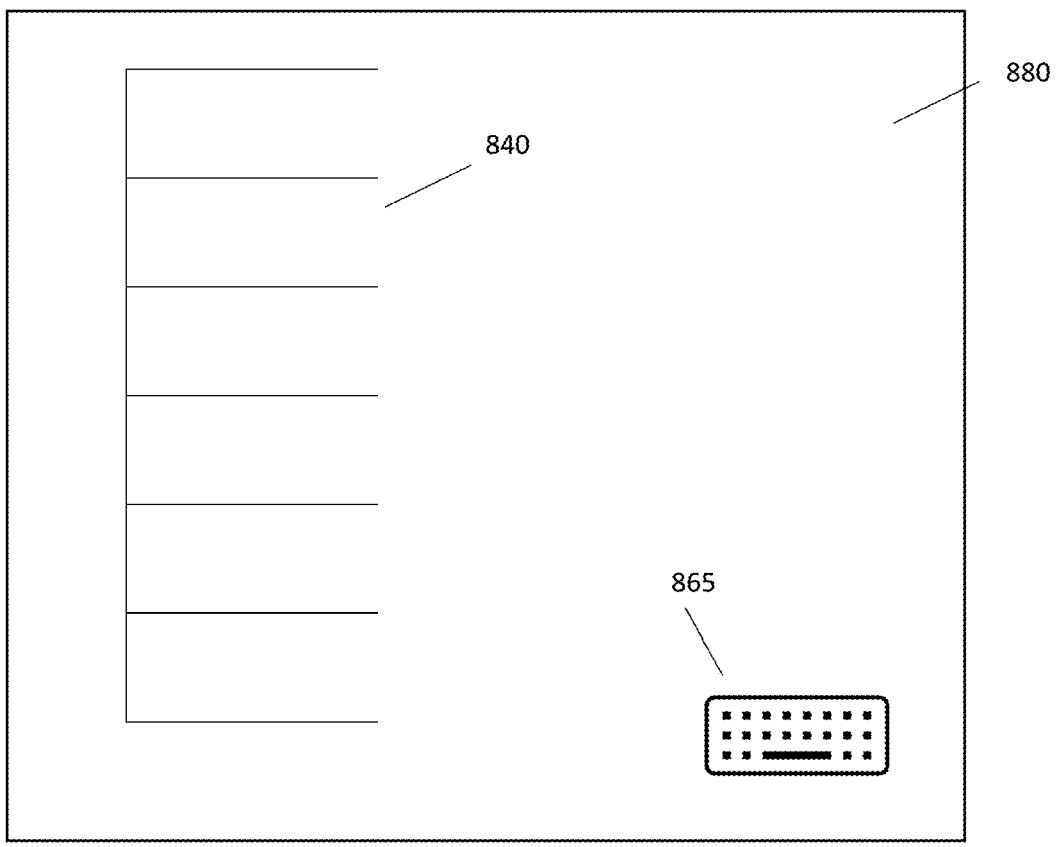

FIG. 7B is a top-down diagram of another floor of a parking garage. As shown in FIG. 7B, this floor 880 is very similar in layout to the floor 820 of FIG. 7A. It is similar in size and features parking spaces 840 in the same location. The key difference between the floors is the presence of a large piece of mechanical infrastructure 865 (e.g., generator, air conditioner, etc.) in the same or similar location as the LIDAR blind spot 860 found on floor 820. Given that floors 820 and 880 are very similar, the apparatus may group them together as part of the same cluster 810. From this, the apparatus may then deduce what might be in the LIDAR blind spot 860 (e.g., a support column, pipping, etc.). In this example, the apparatus may look at various pieces of data and meta-data about the floors. Since floors 820 and 880 are above one another, the presence of the mechanical infrastructure 865 in the same position as the LIDAR blind spot 860 are likely related and thus the apparatus may infer that the blind spot 860 is not safe to drive or otherwise navigate through and navigating nearby should be approached with caution.

In another example, the floors of a cluster may reveal that there are glass doors or another source of LIDAR disruption which has generated the blind spot by obtaining image data or other data for another floor in a given cluster (e.g., something LIDAR alone would struggle to account for). In both these situations, the apparatus need not actually obtain data of the blind spot to infer, predict, or extrapolate what might be within said blind spot. The apparatus may, in other situations, navigate/control one or more cameras (security cameras, traffic cameras, vehicle cameras) and other devices to capture data about the given blind spot to clarify or improve the LIDAR data for the blind spot (see FIG. 8 below).

Figure 8:
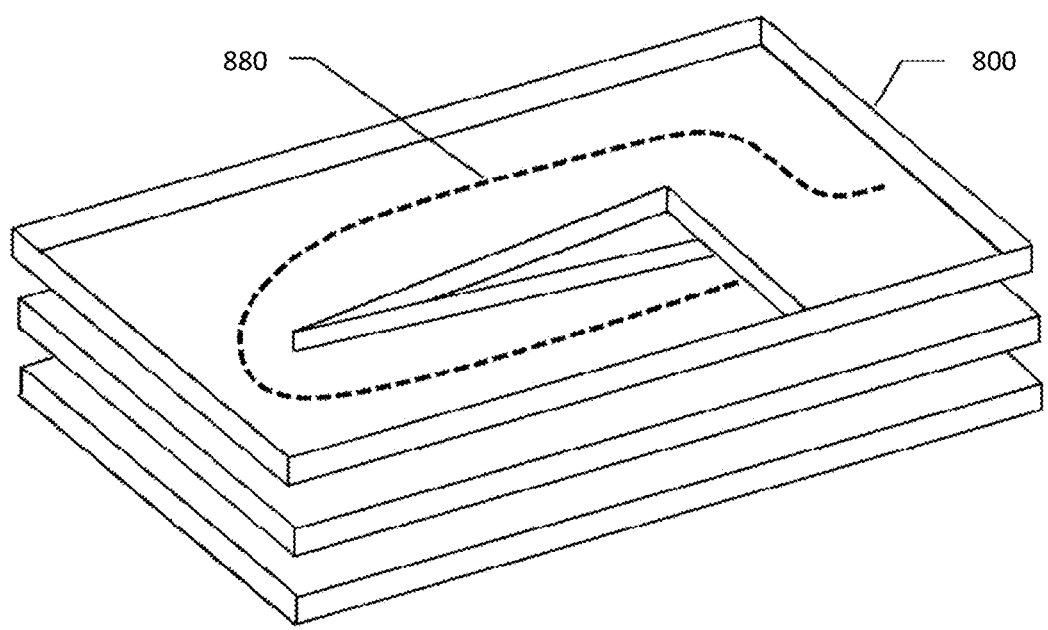
FIG. 8 is an illustration of the apparatus providing route guidance

FIG. 8 is an illustration of the apparatus providing route guidance. As shown in FIG. 8, the apparatus may generate route guidance 880 which navigates various floors 800 of a given parking structure. The routing data may in some examples avoid areas with a LIDAR blind spot. In other example, the routing guidance 880 may route a vehicle or pedestrian towards the LIDAR blind spot so they may capture more data about the blind spot and area(s) proximate to it.

For example, when a blind spot is detected, depending on the severity of the spot, the apparatus may route manned vehicles away from the area temporarily while controlling an automated vehicle to approach the are proximate to the blind spot slowly with hopes of rectifying the lack of data by way of LIDAR, image data, and other sensor data. End users on foot, bike, etc. may also be steered away from a blind spot in some cases and/or prompted to capture more data about the blind spot area as they pass by it.

It should be noted that the vehicles in the examples may represent any vehicle. Such vehicles may be standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle. In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

Although certain methods have been described, it should be understood that other processes and/or modification of one or more of the described processes may also be possible in the context of the present disclosure.

V. CONCLUSION

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for mapping a parking garage, comprising:
   receiving, by one or more processors, floor layout data for at least a first floor of a parking garage;
   based on the received floor layout data for at least a first floor of a parking garage, detecting, by the one or more processors, at least one additional floor layout data for a floor of the parking garage, wherein the at least one additional floor has a substantially similar layout to the first floor of the parking garage;
   in response to detecting the at least one additional floor layout data for a floor of the parking garage, group by the one or more processors, the floors with substantially similar floor layout data into at least one cluster;
   making a determination, by the one or more processors, that at least one of the floor layout data in the cluster contains at least one LIDAR blind spot, wherein the at least one LIDAR blind spot is determined based on the comparison of relative quality of LIDAR data from two or more substantially similar floor layout data in the cluster; and
   based at least on the determination, generating, by the one or more processors, LIDAR data for the at least one LIDAR blind spot, wherein an automated vehicle control based at least in part on the LIDAR blind spot determination is used to control vehicle movement to capture data for at least one LIDAR blind spot.

2. The method of claim 1, wherein the LIDAR data for at least one LIDAR blind spot in a floor layout data is generated from a corresponding area of floor layout data from another floor in a cluster.

3. The method of claim 1, wherein the LIDAR data for at least one LIDAR blind spot in a floor layout data is inferred from image data captured of an area proximate to a LIDAR blind spot.

4. The method of claim 3, wherein the image data is captured from one or more cameras of a vehicle routed to an area proximate to a LIDAR blind spot.

5. The method of claim 1, wherein the LIDAR data for at least one LIDAR blind spot is generated from floor layout data of two or more floors with substantially similar layouts to the floor layout data containing the LIDAR blind spot.

6. The method of claim 1, wherein at least one LIDAR blind spot is determined based on end user driving behavior.

7. An apparatus for mapping a parking garage, comprising:
   one or more processors;
   a non-transitory computer readable medium; and
   program instructions stored on the non-transitory computer readable medium and executable by the one or more processors to:
   receive, by one or more processors, floor layout data for at least a first floor of a parking garage;
   based on the received floor layout data for at least a first floor of a parking garage, detect, by the one or more processors, at least one additional floor layout data for a floor of the parking garage, wherein the at least one additional floor has a substantially similar layout to the first floor of the parking garage;
   in response to detecting the at least one additional floor layout data for a floor of the parking garage, group by the one or more processors, the floors with substantially similar floor layout data into at least one cluster, wherein vehicle routing data is used to detect the floors with substantially similar floor layout data;
   determine, by the one or more processors, that at least one of the floor layout data in the cluster contains at least one LIDAR blind spot, wherein the at least one LIDAR blind spot is determined based on the comparison of relative quality of LIDAR data from two or more substantially similar floor layout data in the cluster; and
   based at least on the determination, generate, by the one or more processors, LIDAR data for the at least one LIDAR blind spot, wherein an automated vehicle control based at least in part on the LIDAR blind spot determination is used to control vehicle movement to capture data for the at least one LIDAR blind spot.

8. The apparatus of claim 7, wherein the LIDAR data for at least one LIDAR blind spot in a floor layout data is generated from a corresponding area of floor layout data from another floor in a cluster.

9. The apparatus of claim 7, wherein the LIDAR data for at least one LIDAR blind spot in a floor layout data is inferred from image data captured of an area proximate to a LIDAR blind spot.

10. The apparatus of claim 9, wherein the image data is captured from one or more cameras of vehicles routed to an area proximate to a LIDAR blind spot.

11. The apparatus of claim 7, wherein the LIDAR data for at least one LIDAR blind spot is generated from floor layout data of two or more floors with substantially similar layouts to the floor layout data containing the LIDAR blind spot.

* * * * *